United States Patent
Tsubouchi

(10) Patent No.: US 9,020,337 B2
(45) Date of Patent: Apr. 28, 2015

(54) RECEIVER AND FAILURE DETECTION METHOD FOR RECEIVER

(71) Applicant: NEC Corporation, Tokyo (JP)

(72) Inventor: Takashi Tsubouchi, Tokyo (JP)

(73) Assignee: NEC Corporation, Tokyo (JP)

( * ) Notice: Subject to any disclaimer, the term of this patent is extended or adjusted under 35 U.S.C. 154(b) by 43 days.

(21) Appl. No.: 13/918,382

(22) Filed: Jun. 14, 2013

(65) Prior Publication Data

US 2014/0023359 A1    Jan. 23, 2014

(30) Foreign Application Priority Data

Jul. 23, 2012  (JP) ................................. 2012-162559

(51) Int. Cl.
*H04B 17/00* (2006.01)
*H04B 10/06* (2006.01)
*H04B 10/079* (2013.01)
*H04B 10/61* (2013.01)

(52) U.S. Cl.
CPC ........ *H04B 10/0799* (2013.01); *H04B 10/6166* (2013.01); *H04B 10/615* (2013.01); *H04B 10/614* (2013.01)

(58) Field of Classification Search
CPC ...... H04B 10/60; H04B 10/61; H04B 10/611; H04B 10/614; H04B 10/6161; H04B 10/6166; H04B 10/63; H04B 10/66; H04B 10/67; H04B 10/672; H04B 10/673; H04B 10/693; H04B 10/6931; H04B 10/07; H04B 10/615; H04B 10/616

USPC ............ 398/10, 17, 24–27, 37, 38, 202–205, 398/208

See application file for complete search history.

(56) References Cited

U.S. PATENT DOCUMENTS

| 8,774,646 B2 * | 7/2014 | McNicol ........................ 398/209 |
| 2011/0318019 A1 * | 12/2011 | Nissov et al. .................. 398/159 |
| 2012/0237211 A1 * | 9/2012 | Iizuka et al. .................... 398/26 |

FOREIGN PATENT DOCUMENTS

JP    2010-245772 A    10/2010

* cited by examiner

*Primary Examiner* — Dalzid Singh
(74) *Attorney, Agent, or Firm* — Sughrue Mion, PLLC

(57) ABSTRACT

A local oscillation light source outputs locally-oscillated light. An light receiving unit phase-separates an input optical signal by making the optical signal interfere with the locally-oscillated light and outputs an analog electric signal corresponding to the phase-separated optical signal. An analog-to-digital converting unit converts the analog electric signal into a digital signal. A processing unit performs digital signal processing by using the digital signal. A failure detection unit determines whether or not the optical signal is being input to the light receiving unit, or detects a failure in the light receiving unit, the analog-to-digital converting unit or the processing unit based on light intensity of the optical signal, whether or not the analog electric signal can be generated in the light receiving unit, and an amplitude of the analog electric signal output from the light receiving unit.

9 Claims, 4 Drawing Sheets

RECEIVER AND FAILURE DETECTION METHOD FOR RECEIVER

INCORPORATION BY REFERENCE

This application is based upon and claims the benefit of priority from Japanese patent application No. 2012-162559, filed on Jul. 23, 2012, the disclosure of which is incorporated herein in its entirety by reference.

BACKGROUND OF THE INVENTION

1. Technical Field

The present invention relates to a receiver and a failure detection method for a receiver. For example, the present invention relates to a receiver related to optical communication and a failure detection method for such a receiver.

2. Background Art

As the Internet traffic has increased, it has been desired to increase the capacity of trunk transmission systems even further. As a technology for increasing the capacity even further, the digital coherent transmission technology is attracting attention. On the receiving side in the digital coherent transmission technology, a receiver equipped with a coherent light receiving unit is used.

The coherent light receiving unit makes an input optical signal interfere with local oscillation light and thereby separates an in-phase optical signal (I-component) from a quadrature phase optical signal (Q-component). Then, the separated optical signal is converted into an electric signal and an analog signal is thereby generated. After that, the analog signal is converted into a digital signal. Further, digital signal processing is performed on the digital signal in a DSP (Digital Signal Processor), so that desired data is demodulated from the digital signal.

An optical receiver, i.e., a receiver used in such a digital coherent transmission technology has been disclosed (Japanese Unexamined Patent Application Publication No. 2010-245772). This optical receiver has a configuration for adjusting the intensity ratio between the optical signal and the local oscillation light in order to improve the reception signal quality when digital coherent communication is performed.

However, the inventors have found out that there are following problems in the receiver like the one described above. There is a case in which when an optical signal is being output from a transmitter, no proper digital signal is output from the receiver due to an occurrence of a failure. In general, the receiver does not have any means for checking whether or not the optical signal is being properly input to the built-in coherent light receiving unit. Therefore, it is impossible to determine whether the failure is caused because no optical signal is being input to the coherent light receiving unit or the receiver itself has broken down. Further, when the failure is caused because the receiver itself has broken down, it is very difficult to determine the aspect of the failure such as the place in the receiver at which the failure has occurred.

SUMMARY

The present invention has been made in view of the above-described circumstances and an exemplary object of the invention is to provide a receiver and a failure detection method for a receiver, capable of determining a cause of a failure.

In a first exemplary aspect of the invention, a receiver includes: a local oscillation light source that outputs locally-oscillated light; an light receiving unit that phase-separates an input optical signal by making the optical signal interfere with the local oscillation light and outputs an analog electric signal corresponding to the phase-separated optical signal; an analog-to-digital converting unit that converts the analog electric signal into a digital signal; a processing unit that performs digital signal processing by using the digital signal; and a failure detection unit that determines whether or not the optical signal is being input to the light receiving unit, or detects a failure in the light receiving unit, the analog-to-digital converting unit or the processing unit based on light intensity of the optical signal, whether or not the analog electric signal can be generated in the light receiving unit, and an amplitude of the analog electric signal output from the light receiving unit.

A second exemplary aspect of the invention is a failure detection method for a receiver, in which: an light receiving unit receives an optical signal and local oscillation light, phase-separates the optical signal by making the optical signal interfere with the local oscillation light, and outputs an analog electric signal corresponding to the phase-separated optical signal, an analog-to-digital converting unit converts the analog electric signal into a digital signal, a processing unit performs digital signal processing by using the digital signal, and light intensity of the optical signal, whether or not the analog electric signal can be generated in the light receiving unit, and an amplitude of the analog electric signal output from the light receiving unit are detected, and based on the detection result, whether or not the optical signal is being input to the light receiving unit, or a failure in the light receiving unit, the analog-to-digital converting unit or the processing unit is detected. The above and other objects, features and advantages of the present invention will become more fully understood from the detailed description given hereinbelow and the accompanying drawings which are given by way of illustration only, and thus are not to be considered as limiting the present invention.

BRIEF DESCRIPTION OF THE DRAWINGS

The above and other aspects, features, and advantages of the present invention will become more apparent from the following description of certain exemplary embodiments when taken in conjunction with the accompanying drawings, in which.

EXEMPLARY EMBODIMENT

Exemplary embodiments according to the present invention are explained hereinafter with reference to the drawings. The same symbols are assigned to the same elements throughout the drawings, and duplicated explanation is omitted as necessary.

First Exemplary Embodiment

Figure 1:
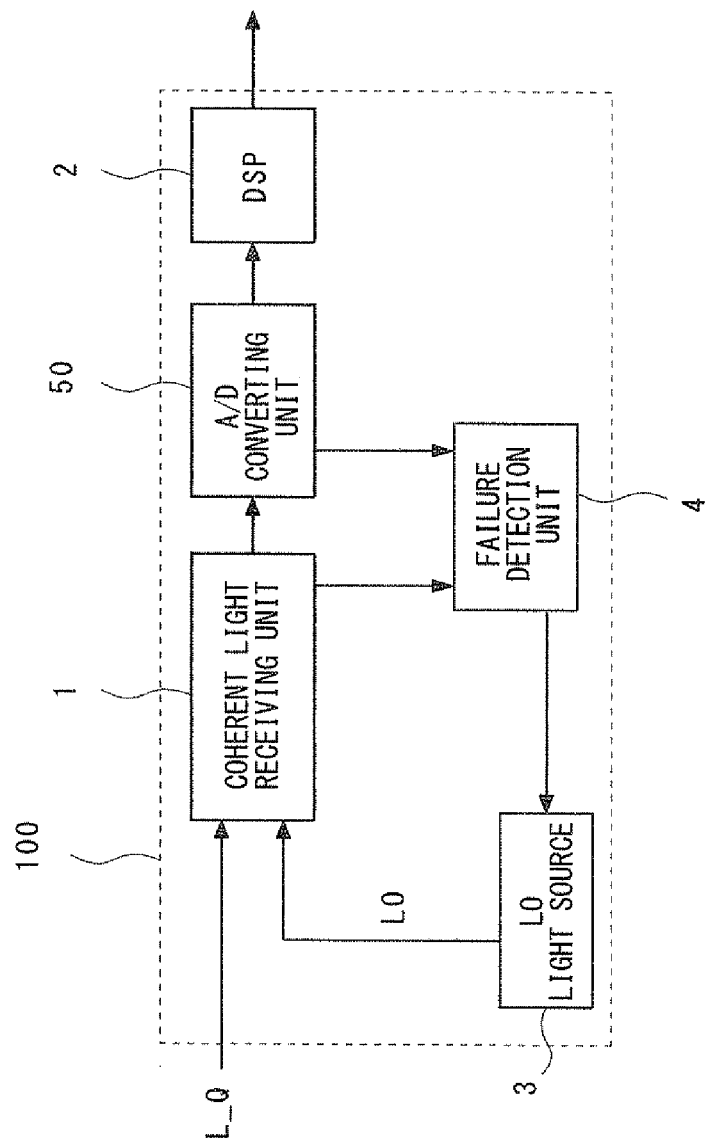
FIG. 1 is a block diagram schematically showing a configuration of a receiver 100 according to a first exemplary embodiment.
Figure 2:
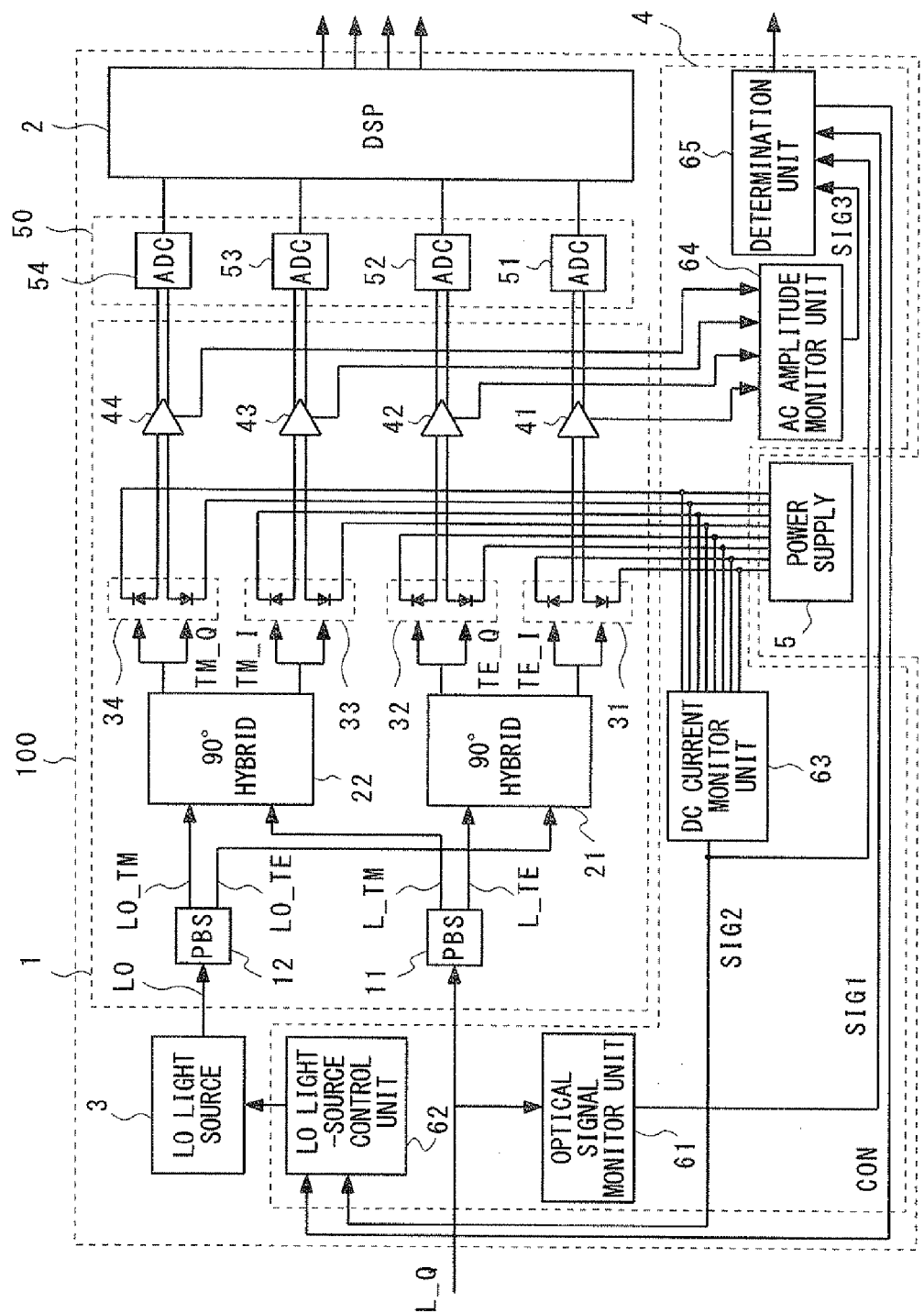
FIG. 2 is a block diagram showing details of the configuration of the receiver 100 shown in FIG. 1.

Firstly, a receiver 100 according to a first exemplary embodiment of the present invention is explained. FIG. 1 is a block diagram schematically showing a configuration of a receiver 100 according to a first exemplary embodiment. Further, FIG. 2 is a block diagram showing details of the configuration of the receiver 100 shown in FIG. 1. The receiver 100 includes a coherent light receiving unit 1, a digital signal processor (hereinafter expressed as "DSP") 2, a local oscillation light source (also referred to as "LO light source") 3, a failure detection unit 4, and an analog-to-digital converting unit (hereinafter expressed as "A/D converting unit") 50.

The coherent light receiving unit 1 includes polarization beam splitters (hereinafter expressed as "PBS") 11 and 12, a 90° hybrids 21 and 22, optical/electrical converters (hereinafter expressed as "O/E") 31 to 34, and trans-impedance amplifiers (hereinafter expressed as "TIA") 41 to 44.

A DP-QPSK optical signal L_Q is input from a transmitter (not shown) to the PBS 11. The PBS 11 separates the input DP-QPSK optical signal L_Q into two orthogonally-polarized components (horizontally-polarized wave L_TE and vertically-polarized wave L_TM). Specifically, the PBS 11 separates the input DP-QPSK optical signal L_Q into a horizontally-polarized wave L_TE and a vertically-polarized wave L_TM that are orthogonal to each other. The horizontally-polarized wave L_TE is input to the 90° hybrid 21 and the vertically-polarized wave L_TM is input to the 90° hybrid 22.

The local oscillation light source 3 outputs local oscillation light LO to the PBS 12. For example, a semiconductor laser may be used for the local oscillation light source 3. Assume that in this exemplary embodiment, the local oscillation light source 3 outputs CW (Continuous Wave) light having a predetermined frequency. The PBS 12 separates the local oscillation light LO into two orthogonally-polarized components (horizontally-polarized local oscillation light LO_TE and vertically-polarized local oscillation light LO_TM). The horizontally-polarized locally-oscillated light LO_TE is input to the 90° hybrid 21 and the vertically-polarized locally-oscillated light LO_TM is input to the 90° hybrid 22.

The 90° hybrid 21 detects the horizontally-polarized wave L_TE by using the horizontally-polarized locally-oscillated light LO_TE and outputs an I (In-phase) component (hereinafter called "TE-I component") and a Q (Quadrature) component (hereinafter called "TE-Q component") as detected lights. The phase of the TE-Q component is different from that of the TE-I component by 90°. The 90° hybrid 22 detects the vertically-polarized wave L_TM by using the vertically-polarized locally-oscillated light LO_TM and outputs an I (In-phase) component (hereinafter called "TM-I component") and a Q (Quadrature) component (hereinafter called "TM-Q component") as detected lights.

The optical/electrical converters 31 to 34, which are supplied with electricity from a power supply 5, convert the four optical signals (TE-I component, TE-Q component, TM-I component, and TM-Q component), respectively, output from the 90° hybrids 21 and 22 into electric signals. Then, the optical/electrical converters 31 to 34 outputs differential analog electric signals generated by the optical/electrical conversions to the TIAs 41 to 44 respectively. Specifically, the optical/electrical converter 31 converts the TE-I component into an electric signal and outputs the generated differential analog electric signal to the TIA 41. The optical/electrical converter 32 converts the TE-Q component into an electric signal and outputs the generated differential analog electric signal to the TIA 42. The optical/electrical converter 33 converts the TM-I component into an electric signal and outputs the generated differential analog electric signal to the TIA 43. The optical/electrical converter 34 converts the TM-Q component into an electric signal and outputs the generated differential analog electric signal to the TIA 44. Each of the optical/electrical converters 31 to 34 is formed by, for example, a photodiode that is supplied with electricity from the power supply 5. That is, each of the optical/electrical converters 31 to 34 has such a structure that when an optical signal is input to the optical/electrical converter, a current flows therethrough. Note that the illustration of the power supply 5 is omitted in FIG. 1 for simplifying the figure.

The TIAs 41 to 44 amplify the differential electric signals output by the optical/electrical converters 31 to 34 respectively and outputs the amplified differential electric signals to A/D converters 51 to 54, respectively, of the A/D converting unit 50. In FIG. 2, each A/D converter is represented by "ADC".

Each of the A/D converters 51 to 54 converts the input differential analog electric signal into a digital signal and outputs the converted digital signal to the DSP 2. The DSP 2 processes the input digital signals and externally outputs demodulated signals indicating the TE-I component, the TE-Q component, the TM-I component, and the TM-Q component.

The failure detection unit 4 includes an optical signal monitor unit 61, a local oscillation light-source control unit (also referred to as "LO light-source control unit") 62, a DC (Direct-Current) current monitor unit 63, an AC (Alternating-Current) amplitude monitor unit 64, and a determination unit 65.

The optical signal monitor unit 61 detects the light intensity of the input DP-QPSK optical signal L_Q. An optical signal monitor value $M_{sig}$ obtained in the optical signal monitor unit 61 is expressed by Expression (1) shown below.

[Expression 1]

$$M_{sig} = a \cdot P_{sig} \quad (1)$$

where the optical signal monitor unit constant a has a positive value and $P_{sig}$ represents the light intensity of the DP-QPSK optical signal L_Q.

Further, the optical signal monitor unit 61 outputs a monitor signal SIG1 indicating the optical signal monitor value $M_{sig}$ to the determination unit 65.

The local oscillation light-source control unit 62 controls the output operation of local oscillation light LO of the local oscillation light source 3 according to a control signal CON from the determination unit 65 and a monitor signal SIG2 from the DC current monitor unit 63.

The DC current monitor unit 63 monitors a current that is generated when the optical/electrical converters 31 to 34 convert optical signals into analog electric signals. In this way, the DC current monitor unit 63 detects a DC current monitor value $M_{DC}$ indicating the magnitude of a current signal that is generated when the optical/electrical converters 31 to 34 convert optical signals into analog electric signals. The DC current monitor value $M_{DC}$ is expressed by Expression (2) shown below.

[Expression 2]

$$M_{DC} = c(P_{sig} + P_{LO}) \quad (2)$$

where the DC current monitor unit constant c has a positive value and $P_{LO}$ represents the light intensity of the local oscillation light LO.

Then, the DC current monitor unit 63 outputs a monitor signal SIG2 indicating the DC current monitor value $M_{DC}$ to the determination unit 65. For example, the DC current monitor unit 63 outputs "HIGH" as the monitor signal SIG2 when the optical/electrical converters 31 to 34 output no current in a state where the DP-QPSK optical signal L_Q is being properly input to the coherent light receiving unit 1, i.e., when the optical/electrical conversion operation is not being properly performed. On the other hand, when the optical/electrical conversion operation is being properly performed, the DC current monitor unit 63 outputs "LOW" as the monitor signal SIG2.

The AC amplitude monitor unit 64 monitors the AC voltage amplitudes of the TIAs 41 to 44. The AC voltage amplitude monitor value $M_{AC}$ obtained in the AC amplitude monitor unit 64 is expressed by Expression (3) shown below.

[Expression 3]

$$M_{AC} = b\sqrt{P_{sig} \cdot P_{LO}} \quad (3)$$

where the AC amplitude monitor unit constant b has a positive value.

Then, the AC amplitude monitor unit 64 outputs a monitor signal SIG3 indicating the AC voltage amplitude monitor value $M_{AC}$ to the determination unit 65. For example, the AC amplitude monitor unit 64 outputs "HIGH" as the monitor signal SIG3 when an amplitude at an output of the A/D converters 51 to 54 is zero or less than a predetermined value in a state where the DP-QPSK optical signal L_Q is being properly input to the coherent light receiving unit 1 and the optical/electrical conversion operation is being properly performed in the optical/electrical converters 31 to 34. On the other hand, when the amplitudes at the outputs of the A/D converters 51 to 54 are greater than the predetermined value, i.e., are in a normal state, the AC amplitude monitor unit 64 outputs "LOW" as the monitor signal SIG3.

The determination unit 65 outputs a control signal CON to the local oscillation light-source control unit 62. Further, the determination unit 65 determines a place at which a failure has occurred according to the monitor signals SIG1 to SIG3. For example, the determination unit 65 determines the light intensity of the DP-QPSK optical signal L_Q according to the level of the monitor signal SIG1. For example, when the monitor signal SIG2 is at "HIGH", the determination unit 65 detects an abnormality. On the other hand, when the monitor signal SIG2 is at "LOW", the determination unit 65 determines that there is no abnormality. For example, when the monitor signal SIG3 is at "HIGH", the determination unit 65 detects an abnormality. On the other hand, when the monitor signal SIG3 is at "LOW", the determination unit 65 determines that there is no abnormality. In other words, the determination unit 65 can detect the presence/absence of an abnormality by detecting the magnitude relation between the levels of the monitor signals SIG1 to SIG3 and predetermined values.

Next, a failure detection operation performed by the receiver 100 is explained. In digital coherent communication, there is a case in which even when the transmitter (not shown) is properly outputting the DP-QPSK optical signal L_Q, the demodulated signal is not properly output from the receiver 100 due to a failure in the communication system including the receiver 100. By performing a failure detection operation in the case like this, it is possible to determine the cause of a failure inside and outside the receiver 100.

Figure 3:
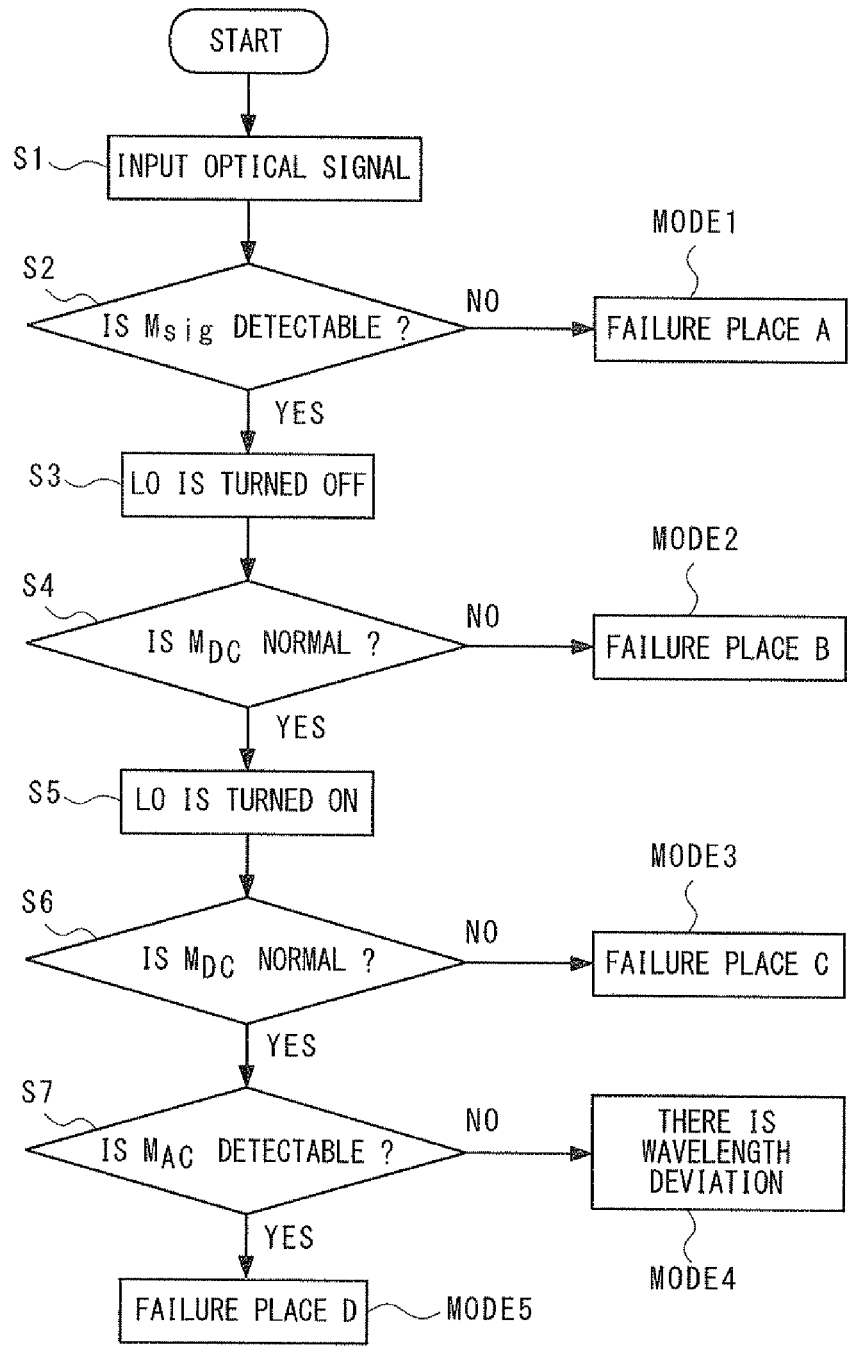
FIG. 3 is a flowchart showing a failure detection operation of a receiver 100 according to a first exemplary embodiment.
Figure 4:
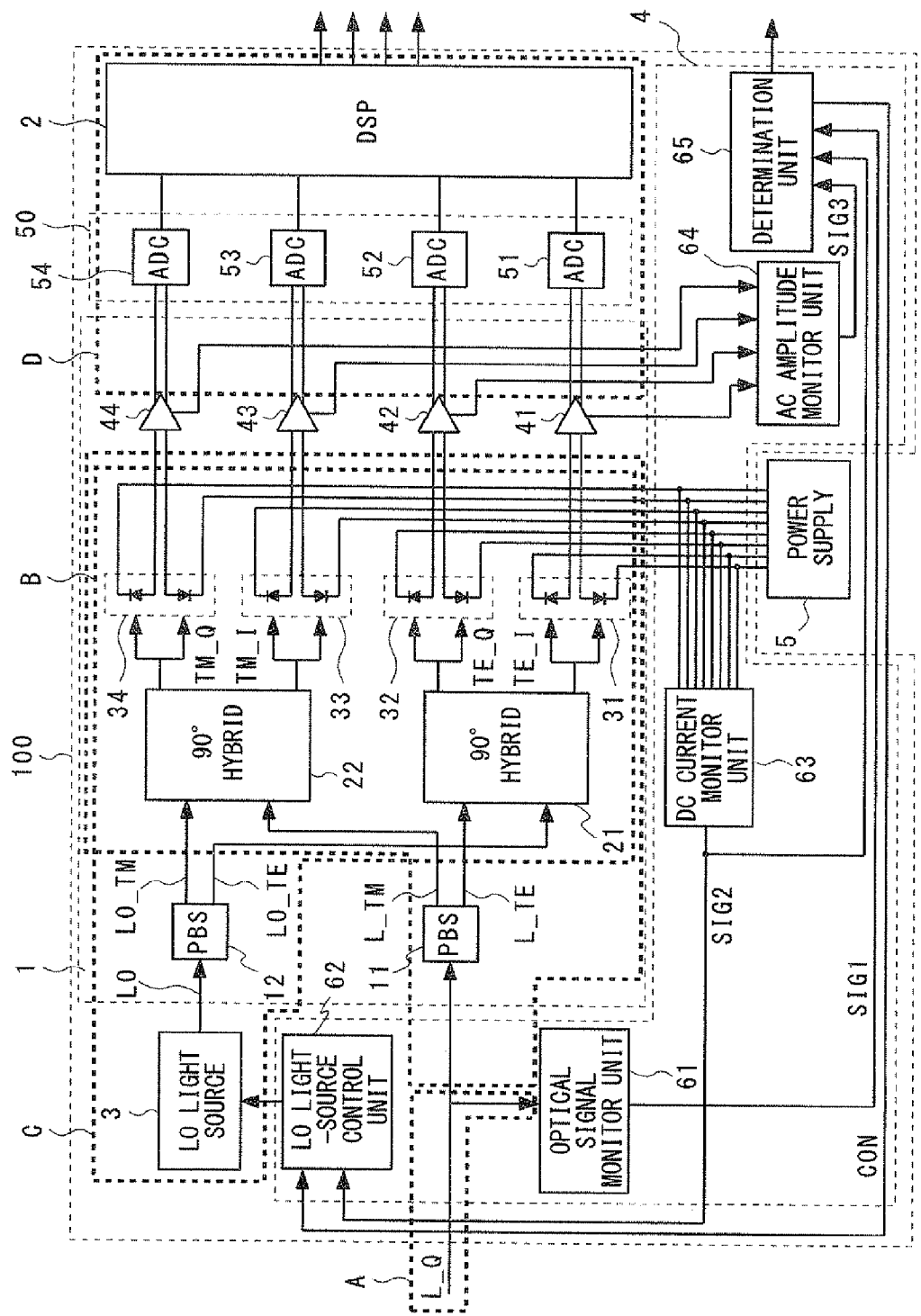
FIG. 4 is a block diagram of a receiver 100 in which places of failures are indicated.

FIG. 3 is a flowchart showing a failure detection operation performed by the receiver 100 according to the first exemplary embodiment. Further, FIG. 4 is a block diagram of the receiver 100 in which failure places are indicated. The following explanation is made under the assumption that the optical signal monitor unit constant a, the AC amplitude monitor unit constant b, and the DC current monitor unit constant c in the above-shown Expressions (1) to (3) are known in advance. That is, assume that the optical signal monitor value $M_{sig}$, the DC current monitor value $M_{DC}$, and the AC voltage amplitude monitor value $M_{AC}$ in a normal state where no failure has occurred are known in advance.

Firstly, to start the failure detection operation, the DP-QPSK optical signal L_Q is input to the receiver 100 (step S1 in FIG. 3).

In this state, it is determined whether or not the optical signal monitor unit 61 can properly detect the light intensity of the DP-QPSK optical signal L_Q (step S2 in FIG. 3). Specifically, the determination unit 65 compares the signal level of the monitor signal SIG1 output from the optical signal monitor unit 61 with a predetermined value.

When the signal level of the monitor signal SIG1 is equal to or less than the predetermined value, the determination unit 65 determines that there is a failure such as a broken wire between the transmitter (not shown) that outputs the DP-QPSK optical signal L_Q and the optical signal monitor unit 61 (i.e., in the failure place A in FIG. 4) (MODE 1 in FIG. 3). Then, the determination unit 65 outputs the determination result.

When the signal level of the monitor signal SIG1 is greater than the predetermined value, the determination unit 65 determines that the optical signal monitor unit 61 properly detects the light intensity of the DP-QPSK optical signal L_Q. Then, the determination unit 65 stops the output of the local oscillation light LO from the local oscillation light source 3 by using the control signal CON (step S3 in FIG. 3).

In this state, it is determined whether or not the DC current monitor unit 63 can properly detect the DC current value (step S4 in FIG. 3). Specifically, the determination unit 65 compares the signal level of the monitor signal SIG2 output from the DC current monitor unit 63 with a predetermined value. Since the local oscillation light LO is in an off-state, part of the DP-QPSK optical signal L_Q is input to the optical/electrical converters 31 to 34 through the 90° hybrids 21 and 22. Therefore, when the receiver 100 is in a normal state, a current flows through the optical/electrical converters 31 to 34 according to the input DP-QPSK optical signal L_Q.

When the signal level of the monitor signal SIG2 is equal to or less than the predetermined value, the determination unit 65 determines that there is a failure such as a broken wire between the branch section at which the DP-QPSK optical signal L_Q is branched to the optical signal monitor unit 61 and the optical/electrical converters 31 to 34 (i.e., in the failure place B in FIG. 4) (MODE 2 in FIG. 3). Then, the determination unit 65 outputs the determination result.

When the signal level of the monitor signal SIG2 is greater than the predetermined value, the determination unit 65 determines that the DP-QPSK optical signal L_Q is properly input to the optical/electrical converters 31 to 34. Then, the determination unit 65 restarts the output of the local oscillation light LO from the local oscillation light source 3 by using the control signal CON (step S5 in FIG. 3).

In this state, it is determined again whether or not the DC current monitor unit 63 can properly detect the DC current value (step S6 in FIG. 3). Specifically, the determination unit 65 compares the signal level of the monitor signal SIG2 output from the DC current monitor unit 63 with a predetermined value. Since the local oscillation light LO is in an on-state, the TE-I component, the TE-Q component, the TM-I component, and the TM-Q component are input to the optical/electrical converters 31 to 34 respectively when the receiver 100 is in a normal state.

When the signal level of the monitor signal SIG2 is equal to or less than the predetermined value, the determination unit 65 determines that there is a failure such as a broken wire between the local oscillation light source 3 and the optical/electrical converters 31 to 34 (i.e., in the failure place C in FIG. 4) (MODE 3 in FIG. 3). Then, the determination unit 65 outputs the determination result.

When the signal level of the monitor signal SIG2 is greater than the predetermined value, the determination unit 65 determines that the TE-I component, the TE-Q component, the TM-I component, and the TM-Q component are being properly input to the optical/electrical converters 31 to 34 respectively.

Next, it is determined whether or not AC amplitudes at the outputs of the TIAs 41 to 44 can be properly detected (step S7 in FIG. 3). Specifically, the determination unit 65 compares the signal level of the monitor signal SIG3 output from the AC amplitude monitor unit 64 with a predetermined value. Since the local oscillation light LO is in an on-state, voltage signals output from the optical/electrical converters 31 to 34 are input to the TIAs 41 to 44 respectively according to the TE-I component, the TE-Q component, the TM-I component, and the TM-Q component respectively. Therefore, when the receiver 100 is in a normal state, the input voltage signals are amplified in the TIAs 41 to 44.

When the signal level of the monitor signal SIG3 is equal to or less than the predetermined value, the determination unit 65 determines that there is a wavelength deviation between the DP-QPSK optical signal L_Q and the local oscillation light LO (MODE 4 in FIG. 3). Then, the determination unit 65 outputs the determination result.

When the signal level of the monitor signal SIG3 is greater than the predetermined value, the determination unit 65 determines that there is a failure such as a broken wire between the outputs of the TIAs 41 to 44 and the A/D converters 51 to 54, or in the DSP 2 (i.e., in the failure place D in FIG. 4) (MODE 5 in FIG. 3). Then, the determination unit 65 outputs the determination result.

As explained above, the receiver 100 can determine the presence/absence of a failure inside and outside the receiver 100. Further, the receiver 100 can determines the cause of a failure inside and outside the receiver 100.

Further, when a coherent reception is performed as in the case of the receiver 100, there is an optimal AC amplitude in the input to the A/D converting unit 50 with which the reception sensitivity is optimized. As shown above, the relation among the AC amplitude, the light intensity of the DP-QPSK optical signal, and the light intensity of the local oscillation light LO is expressed by the above-shown Expressions (1) to (3).

Immediately after the shipment of a transceiver equipped with a receiver 100, the light intensity of the DP-QPSK optical signal and the light intensity of the local oscillation light LO have been adjusted to optimal values so that the maximum reception sensitivity is obtained. However, when the transceiver is used for a long time, a phenomenon that the intensity ratio deviates could occur due to the degradation of the local oscillation light source 3 and/or the degradation of the light propagation section (e.g., the 90° hybrid) within the coherent light receiving unit 1. Note that the degradation of the local oscillation light source 3 means that the actual light intensity of the local oscillation light LO input to the coherent light receiving unit decreases in comparison to the output intensity set value of the local oscillation light source 3. Further, the degradation of the 90° hybrid means an increase in the light propagation loss of the 90° hybrid. These losses may be compensated by increasing the output intensity set value of the local oscillation light source 3 to an appropriate value. For example, the light intensity of the local oscillation light source 3 with which the AC amplitude is optimized for the A/D converting unit 50 is determined by using the optical signal monitor unit 61 and the DC current monitor unit 63. Then, the determined light intensity may be set as the output intensity set value of the local oscillation light source 3.

Note that the present invention is not limited to the above-described exemplary embodiments, and various modifications can be made as appropriate without departing from the spirit of the present invention. For example, the optical signal input to the receiver 100 is not limited to the DP-QPSK optical signal. That is, optical signals modulated by using other modulation techniques may be input to the receiver 100. Further, the present invention is not limited to the two polarized-wave multiplexing. That is, the present invention is also applicable to receptions of multiple signals of three or more polarized-waves.

Although examples in which optical/electrical converters output differential analog signals are shown in the above-described exemplary embodiments, the differential configuration is not indispensable.

Further, the configuration of the coherent light receiving unit 1 is a mere example. That is, other configurations can be also used, provided that the I component and the Q component can be separated for each of two polarized waves from the DP-QPSK optical signal and that the current values of the optical/electrical converting units and the AC amplitudes of the amplifiers can be monitored.

An exemplary advantage according to the above-described embodiments is to provide a receiver and a failure detection method for a receiver, capable of determining a cause of a failure.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A receiver comprising:
   a local oscillation light source that outputs local oscillation light;
   an light receiving unit that phase-separates an input optical signal by making the optical signal interfere with the local oscillation light and outputs an analog electric signal corresponding to the phase-separated optical signal;
   an analog-to-digital converting unit that converts the analog electric signal into a digital signal;
   a processing unit that performs digital signal processing by using the digital signal; and
   a failure detection unit that determines whether or not the optical signal is being input to the light receiving unit, or detects a failure in the light receiving unit, the analog-to-digital converting unit or the processing unit based on light intensity of the optical signal, whether or not the analog electric signal can be generated in the light receiving unit, and an amplitude of the analog electric signal output from the light receiving unit, wherein
   the light receiving unit comprises:
   a hybrid element that phase-separates the optical signal;
   a plurality of optical/electrical converters each of which converts a respective one of the phase-separated optical signals output from the hybrid element into an electric signal and thereby outputs the analog electric signal; and
   a plurality of amplifiers each of which amplifies a respective one of the analog electric signals output from the plurality of optical/electrical converters, and the failure detection unit comprises:
an optical signal monitor circuit that receives a part of the optical signal and outputs a first monitor signal according to light intensity of the part of the optical signal, the part of the optical signal being branched from the optical signal;
a DC current monitor unit that outputs a second monitor signal according to a current that flows when the plurality of optical/electrical converting units perform an optical/electrical conversion operation;
an AC amplitude monitor unit that detects a voltage amplitude at an output of the plurality of amplifiers and outputs a third monitor signal according to the voltage amplitude; and
a determination unit that determines whether or not the optical signal is being input to the light receiving unit, or whether or not a failure has occurred in the light receiving unit, the analog-to-digital converting unit or the processing unit based on the first to third monitor signals.

2. The receiver according to claim 1, wherein when the optical signal is not being input to the optical signal monitor circuit, the determination unit determines that a failure has occurred in a first failure place between a path at which the optical signal is input to the receiver and an input section of the optical signal monitor circuit at which the optical signal is input.

3. The receiver according to claim 2,
wherein the failure detection unit further comprises a local oscillation light-source control unit that controls an output operation of local oscillation light of the local oscillation light source according to a control signal output from the determination unit, and
wherein in a state where no failure has occurred in the first failure place, the determination unit stops an output of the local oscillation light from the local oscillation light source by using the control signal, and
when the second monitor signal is less than a predetermined value, the determination unit determines that a failure has occurred in a second failure place between a place at which the optical signal is branched and the plurality of optical/electrical converters.

4. The receiver according to claim 3, wherein
in a state where no failure has occurred in the first and second failure places, the determination unit restarts the output of the local oscillation light from the local oscillation light source by using the control signal, and
when the second monitor signal is less than a predetermined value, the determination unit determines that a failure has occurred in a third failure place between the local oscillation light source and the plurality of optical/electrical converters.

5. The receiver according to claim 4, wherein
in a state where no failure has occurred in the first to third failure places, the determination unit determines, when the third monitor signal is less than a predetermined value, that a wavelength of the optical signal is not equal to a wavelength of the local oscillation light, and
the determination unit determines, when the third monitor signal is equal to or greater than the predetermined value, that a failure has occurred in a fourth failure place, the fourth failure place extending from an output of the plurality of amplifiers to the processing unit through the analog-to-digital converting unit.

6. A receiver comprising:
a local oscillation light source that outputs local oscillation light;
an light receiving unit that phase-separates an input optical signal by making the optical signal interfere with the local oscillation light and outputs an analog electric signal corresponding to the phase-separated optical signal;
an analog-to-digital converting unit that converts the analog electric signal into a digital signal;
a processing unit that performs digital signal processing by using the digital signal; and
a failure detection unit that determines whether or not the optical signal is being input to the light receiving unit, or detects a failure in the light receiving unit, the analog-to-digital converting unit or the processing unit based on light intensity of the optical signal, whether or not the analog electric signal can be generated in the light receiving unit, and an amplitude of the analog electric signal output from the light receiving unit, wherein
the light receiving unit comprises:
first polarized-wave separation unit that polarization-separates the optical signal into first and second polarized optical signals, the optical signal being polarization-multiplexed and phase-modulated;
second polarized-wave separation unit that polarization-separates the local oscillation light into first polarized local oscillation light having the same polarization plane as that of the first polarized optical signal and second polarized local oscillation light having the same polarization plane as that of the second polarized optical signal;
first phase separation unit that phase-separates the first polarized optical signal by making the first polarized optical signal interfere with the first polarized local oscillation light, and thereby outputting first and second optical signals;
second phase separation unit that phase-separates the second polarized optical signal by making the second polarized optical signal interfere with the second polarized local oscillation light, and thereby outputting third and fourth optical signals;
a plurality of optical/electrical converters including first to fourth optical/electrical converters that convert the first to fourth optical signals respectively into electric signals and thereby output first to fourth analog electric signals respectively; and
a plurality of amplifiers including first to fourth amplifiers that amplify the first to fourth analog electric signals respectively, and
the analog-to-digital converting unit comprises first to fourth analog-to-digital converters that convert the amplified first to fourth analog electric signals respectively into digital signals.

7. The receiver according to claim 6, wherein the failure detection unit comprises:
an optical signal monitor circuit that receives a part of the optical signal and outputs a first monitor signal according to light intensity of the part of the optical signal, the part of the optical signal being branched from the optical signal;
a DC current monitor unit that outputs a second monitor signal according to a current that flows when the first to fourth optical/electrical converting units perform an optical/electrical conversion operation;
an AC amplitude monitor unit that outputs a third monitor signal according to a voltage amplitude at an output of the first to fourth amplifiers; and
a determination unit that determines whether or not the optical signal is being input to the light receiving unit, or whether or not a failure has occurred in the light receiving unit, the analog-to-digital converting unit or the processing unit based on the first to third monitor signals.

8. A method for performing failure detection, comprising:
outputting, by a local oscillation light source, local oscillation light;
phase-separating, by a light receiving unit, an input optical signal by making the optical signal interfere with the local oscillation light, and outputting an analog electric signal corresponding to the phase-separated optical signal;
converting, by an analog-to-digital converting unit, the analog electric signal into a digital signal;
performing, by a processing unit, digital signal processing by using the digital signal; and
determining, by a failure detection unit, whether or not the optical signal is being input to the light receiving unit, or detecting a failure in the light receiving unit, the analog-to-digital converting unit or the processing unit based on light intensity of the optical signal, determining whether or not the analog electric signal can be generated in the light receiving unit, and an amplitude of the analog electric signal output from the light receiving unit,
wherein the phase-separating the input optical signal and outputting the analog electric signal comprises:
phase-separating, by a hybrid element, the optical signal;
converting, by each of a plurality of optical/electrical converters, a respective one of the phase-separated optical signals output from the hybrid element into an electric signal and thereby outputting the analog electric signal; and
amplifying, by each of a plurality of amplifiers, a respective one of the analog electric signals output from the plurality of optical/electrical converters, and
wherein determining by the failure detection unit comprises:
receiving, by an optical signal monitor circuit, a part of the optical signal, and outputting a first monitor signal according to light intensity of the part of the optical signal, the part of the optical signal being branched from the optical signal;
outputting, by a DC current monitor unit, a second monitor signal according to a current that flows when the plurality of optical/electrical converting units perform an optical/electrical conversion operation;
detecting, by an AC amplitude monitor unit, a voltage amplitude at an output of the plurality of amplifiers, and outputting a third monitor signal according to the voltage amplitude; and
determining, by a determination unit, whether or not the optical signal is being input to the light receiving unit, or whether or not a failure has occurred in the light receiving unit, the analog-to-digital converting unit or the processing unit based on the first to third monitor signals.

9. A method for performing failure detection, comprising:
outputting, by a local oscillation light source, local oscillation light;
phase-separating, by a light receiving unit, an input optical signal by making the optical signal interfere with the local oscillation light, and outputting an analog electric signal corresponding to the phase-separated optical signal;
converting, by an analog-to-digital converting unit, the analog electric signal into a digital signal;
performing, by a processing unit, digital signal processing by using the digital signal; and
determining, by a failure detection unit, whether or not the optical signal is being input to the light receiving unit, or detecting a failure in the light receiving unit, the analog-to-digital converting unit or the processing unit based on light intensity of the optical signal, determining whether or not the analog electric signal can be generated in the light receiving unit, and an amplitude of the analog electric signal output from the light receiving unit, wherein
wherein the phase-separating the input optical signal and outputting the analog electric signal comprises:
polarization-separating, by a first polarized-wave separation unit, the optical signal into first and second polarized optical signals, the optical signal being polarization-multiplexed and phase-modulated;
polarization-separating, by a second polarized-wave separation unit, the local oscillation light into first polarized local oscillation light having the same polarization plane as that of the first polarized optical signal and second polarized local oscillation light having the same polarization plane as that of the second polarized optical signal;
phase-separating, by a first phase separation unit, the first polarized optical signal by making the first polarized optical signal interfere with the first polarized local oscillation light, and thereby outputting first and second optical signals;
phase-separating, by a second phase separation unit, the second polarized optical signal by making the second polarized optical signal interfere with the second polarized local oscillation light, and thereby outputting third and fourth optical signals;
converting, by a plurality of optical/electrical converters including first to fourth optical/electrical converters, the first to fourth optical signals respectively into electric signals and thereby outputting first to fourth analog electric signals respectively; and
amplifying, by a plurality of amplifiers including first to fourth amplifiers, the first to fourth analog electric signals respectively, and
converting, by the analog-to-digital converting unit which includes first to fourth analog-to-digital converters, the amplified first to fourth analog electric signals respectively into digital signals.

* * * * *